United States Patent
Lutnicj et al.

(10) Patent No.: US 8,380,602 B2
(45) Date of Patent: Feb. 19, 2013

(54) EXCHANGE FOR FRACTIONAL INTERESTS AND USAGE RIGHTS IN A COLLECTION OF ASSETS

(75) Inventors: Howad W. Lutnicj, New York, NY (US); Dean P. Alderucci, Westport, CT (US); Thomas D. Bradshaw, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 12/776,230

(22) Filed: May 7, 2010

(65) Prior Publication Data

US 2011/0022494 A1    Jan. 27, 2011

Related U.S. Application Data

(60) Provisional application No. 61/227,120, filed on Jul. 21, 2009.

(51) Int. Cl.
  *G06Q 30/00* (2006.01)
(52) U.S. Cl. ........ 705/36 R; 705/1.1; 705/26.1; 705/80; 705/306
(58) Field of Classification Search .................. 705/1.1, 705/26–27, 36
See application file for complete search history.

(56) References Cited

U.S. PATENT DOCUMENTS

| | | | |
|---|---|---|---|
| 5,926,793 A | 7/1999 | de Rafael et al. | |
| 6,173,270 B1 * | 1/2001 | Cristofich et al. | 705/37 |
| 6,338,047 B1 * | 1/2002 | Wallman | 705/36 R |
| 7,130,825 B2 | 10/2006 | Vlahoplus et al. | |
| 7,212,982 B2 | 5/2007 | Daum | |
| 7,263,504 B2 | 8/2007 | Galai et al. | |
| 7,526,444 B2 | 4/2009 | Miles et al. | |
| 7,865,416 B1 | 1/2011 | Graff et al. | |
| 2002/0019793 A1 * | 2/2002 | Frattalone | 705/36 |
| 2002/0040335 A1 | 4/2002 | Veux et al. | |
| 2002/0042771 A1 * | 4/2002 | Shields et al. | 705/37 |
| 2002/0073015 A1 | 6/2002 | Chan et al. | |
| 2002/0077874 A1 | 6/2002 | Dakin | |
| 2003/0139950 A1 | 7/2003 | Daum | |
| 2003/0212624 A1 | 11/2003 | Sanghavi et al. | |
| 2003/0225702 A1 | 12/2003 | Martin et al. | |
| 2003/0229573 A1 | 12/2003 | Southland | |

(Continued)

FOREIGN PATENT DOCUMENTS

| | | |
|---|---|---|
| CN | 1949262 | 4/2007 |
| KR | 2003-0039619 | 5/2003 |

(Continued)

OTHER PUBLICATIONS

Zaretsky, "The End of Fractional Gifts?" Sep. 6, 2006, The Art Law Blog, John Silberman Associates.*

(Continued)

*Primary Examiner* — Adam Levine

(57) ABSTRACT

Methods and systems are provided herewith for exchanging and rating works of art. A value for each of a plurality of portfolios of art owned by a plurality of participants is determined Ownership interests in the plurality of portfolios of art are pooled in a legal ownership entity. For each participant, an initial participant value is determined based on the determined value of each portfolio of art owned by the respective participant. A respective quantity of shares of the legal ownership entity for each respective participant is determined based on the participant value determined for the participant. An indicia of the respective quantity of shares is transmitted to each respective participant. Participants may buy and sell usage and ownership interests in the portfolios of art. Participants may also redeem their shares for cash or other value.

8 Claims, 5 Drawing Sheets

U.S. PATENT DOCUMENTS

| | | | |
|---|---|---|---|
| 2004/0006507 A1 | 1/2004 | Laufer |
| 2004/0006525 A1 | 1/2004 | Roberts et al. |
| 2004/0193523 A1 | 9/2004 | Roberts et al. |
| 2005/0027614 A1 | 2/2005 | McKelvey |
| 2005/0049918 A1 | 3/2005 | Rovner |
| 2005/0125323 A1 | 6/2005 | Warren |
| 2005/0137934 A1 | 6/2005 | Handler et al. |
| 2005/0160022 A1 | 7/2005 | Chesney |
| 2005/0197943 A1 | 9/2005 | Galai et al. |
| 2007/0050260 A1 | 3/2007 | Jackson |
| 2007/0061239 A1 | 3/2007 | Deline |
| 2007/0106594 A1 | 5/2007 | Vlahoplus et al. |
| 2007/0130055 A1 | 6/2007 | Heaton et al. |
| 2007/0288337 A1 | 12/2007 | Kachel |
| 2008/0046355 A1 | 2/2008 | Lo |
| 2008/0077452 A1 | 3/2008 | Dugan et al. |
| 2008/0120216 A1* | 5/2008 | Saigh et al. ............ 705/36 R |
| 2008/0126235 A1 | 5/2008 | Sullivan et al. |
| 2008/0140557 A1 | 6/2008 | Bowlby |
| 2008/0147541 A1 | 6/2008 | Jones |
| 2008/0154686 A1 | 6/2008 | Vicino |
| 2008/0167979 A1 | 7/2008 | Somers |
| 2008/0183511 A1 | 7/2008 | Handler et al. |
| 2008/0195527 A1 | 8/2008 | Barreiro et al. |
| 2008/0249829 A1 | 10/2008 | Vicino |
| 2008/0306879 A1 | 12/2008 | Legatz |
| 2009/0083137 A1 | 3/2009 | Tsai et al. |
| 2009/0150255 A1 | 6/2009 | Baker |

FOREIGN PATENT DOCUMENTS

| | | |
|---|---|---|
| WO | WO 00/55778 | 9/2000 |
| WO | WO 00/63794 | 10/2000 |
| WO | WO 02/46874 | 6/2002 |
| WO | WO 02/49256 | 6/2002 |
| WO | WO 03/062951 | 7/2003 |
| WO | WO 2007/027772 | 3/2007 |
| WO | WO 2007/134072 | 11/2007 |
| WO | WO 2008/021282 | 2/2008 |
| WO | WO 2008/070146 | 6/2008 |
| WO | WO 2008/079196 | 7/2008 |

OTHER PUBLICATIONS

U.S. Appl. No. 12/776,230, filed May 7, 2010; 73 pages.

Goetzmann, William N., "Accounting for Taste: Art and the Financial Markets over Three centuries;" The American Economic Review, vol. 83, No. 5 (Dec. 1993); pp. 1370-1376.

"Research Flash: Investment Ideas, Focus on Art Market;" Credit Suisse; May 27, 2009; 7 pages.

Mei, Jianping and Moses, Michael, "Art that Beats the S&P," Forbes.com; accessed at http://www.forbes.com/2008/12/03/art-index-collecting-forbeslife-cx_af_1203index.html; Dec. 3, 2008; 1 page.

"The 500 indexes created by Art Market Research since 1985 are accepted as the definitive measure of price-movements in the art and related markets world-wide," Art Market Research; accessed at http://www.artmarketresearch.com/amr_fr.html; 2000; 1 page.

"New Art Index created to track Post-War Art," Wealth Management; accessed at http://www.cpifinancial.net/v2/print.aspx?pg=news&aid=3180; Aug. 25, 2009; 1 page.

Mei, Jianping and Moses, Michael, "Art as an Investment and the underperformance of Masterpieces," Feb. 2002; pp. 1-23.

"The Mei Moses Fine Art Index: Art Turns Down in 2008 by Almost 4.5% but Dramatically Outperforms the Decline in Equities," Beautiful Asset Advisors, LLC; accessed Oct. 16, 2009 at http://www.artasanasset.com/market/; 1 page.

Mei, Jianping and Moses, Michael, "Art as an Investment and the underperformance of Masterpieces," Aug. 2001; pp. 1-34.

"The Mei Moses Fine Art Index: Index Data"; Beautiful Asset Advisors, LLC; accessed Oct. 16, 2009 at http://www.artasanasset.com/indices/; 1 page.

"The Mei Moses Fine Art Index: Computation, Data Collection and Latest Value of the Mei Moses® All Art Index," Beautiful Asset Advisors, LLC; accessed Oct. 16, 2009 at http://www.artasanasset.com/main/computation.php; 1 page.

Salmon, Felix, "Returns on Art," Reuters Blog; accessed at http://blogs.reuters.com/felix-salmon/2009/10/06/returns-on-art/ ; Oct. 6, 2009; 1 page.

Driscoll, Ian, "Top-notch art oils the wheels of lending," Financial Times; accessed at http://www.ft.com/cms/s/0/457d83f8-ec04-11dd-8838-0000779fd2ac,dwp_uuid=d8e9ac2a-30dc-11da-ac1b-00000e2511c8.html?nclick_check=1; Jan. 27, 2009; 2 page.

Madon, Connie, "What is the Mei Moses Art Index?"; accessed at http://www.bloggingstocks.com/2009/02/19/what-is-the-mei-moses-art-index/; Feb. 19, 2009; 1 page.

U.S. Appl. No. 12/776,237, filed May 7, 2010; 73 pages.

U.S. PTO Office action for U.S. Appl. No. 12/776,237 dated Dec. 30, 2011; 13 pages.

* cited by examiner

Enter Rating Information
User: John Doe | Account #12345

Selected Art Work:
- Artwork A
- Artwork B

Upload images

- Artist name
- Title
- Medium (painting, sculpture)
- Historical time period
- Related artists
- Notes
- Other information

- Date of creation
- School of art
- City and/or Country
- Size / Dimensions
- Dominant Color
- Other colors
- Last sale price
- Estimated current value

500

EXCHANGE FOR FRACTIONAL INTERESTS AND USAGE RIGHTS IN A COLLECTION OF ASSETS

RELATED APPLICATIONS

This application claims the benefit of U.S. Provisional Application Ser. No. 61/227,120 filed Jul. 21, 2009, which is incorporated by reference herein in its entirety.

FIELD OF THE INVENTION

This application is generally related to systems and methods for distributing and/or exchanging interests in one or more assets among users.

DETAILED DESCRIPTION

Figure 1:
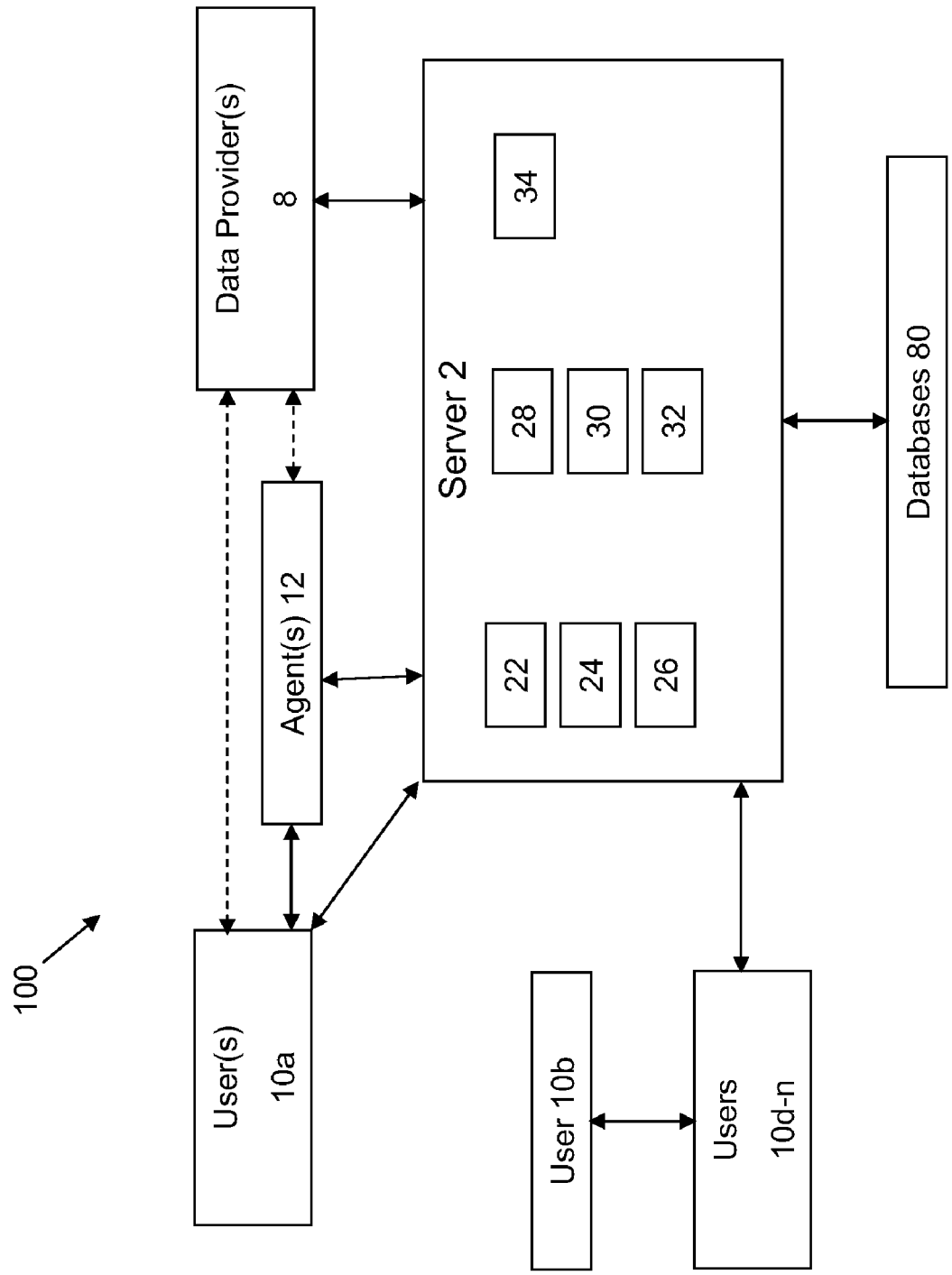
FIG. 1 depicts a system according to at least one embodiment of the systems disclosed herein.

The following sections I-XI provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates may things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internal Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. §1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Other Definitions

A "work of art" means a physical painting, drawing, photograph, or sculpture. The "work of art" is embodied in or on a non-electronic physical medium or surface so that it is visible on the medium without the use of electricity. A painting or drawing may be a result of a practice of applying paint, pigment, color or other medium to a surface such as a wall, paper, canvas, wood, glass, lacquer, clay, or concrete. Other media applied to a painting or drawing may include one or more of colored ink, acrylic, dry pastel, enamel paint, encaustic (wax), fresco, gouache, ink (e.g., colored ink), oil, oil pastel, spray paint (e.g., graffiti), tempera, water miscible oil paints, and/or watercolor.

A "piece of art" means any physical item in a graphic or plastic medium that is a conscious production or arrangement of colors, forms, movements, or other elements in a manner that affects the sense of beauty. A "work of art" is a physical product of deliberately arranging elements in a way that appeals to the senses or emotions. A work of art may be in any physical medium, including images, video, sounds, text, words, and patterns stored or otherwise embodied in software. For instance, a "work of art" may comprise an image stored on a hard drive.

A "digital piece of art" means a digital embodiment of a piece of art or a work of art, in which the digital embodiment may comprise a digital representation (e.g., a digital file stored on a computer-readable medium, or digitally output via a computer output device such as a speaker or monitor) of the piece of art or work of art. For example, a digital piece of art may comprise one or more video or sound files (in stored or executed electronic form) of images (e.g., a digital image representation of a photograph taken by Annie Liebowitz), moving images (e.g., movies, such as a digital copy of a movie directed by James Cameron), and sound such as music (e.g., a digital representation of a symphony composed by Beethoven or a composition by Philip Glass).

One of ordinary skill in the art will appreciate that the features and functions of the invention described herein may apply equally to digital pieces of art as they do to works of art, pieces of art, and other art assets. For example, digital pieces of art may be delivered to users electronically, e.g., via FTP file transfer, email, wifi, mobile device (e.g., cell phone) transmission, or other electronic delivery means.

An "art asset" as used herein refers to any and all forms of tangible assets which have value, such as, but not limited to, the works by art masters, primary art work, secondary art work, fine arts, contemporary works and modern works; of any historical period, cultural and geographical style, design and type. Assets may also include educational materials, scientific materials, electronic books or libraries, music memorabilia, sheet music, records, movies, films, motion pictures, compact discs, digital video discs, musical instruments, entertainment devices or any type of intellectual property. An asset may also include tangible collectibles which have value, such as, but not limited to, ancient historical artifacts, memorabilia, weapons, toys, stamps and coins (both rare coins, bullion, precious metals, precious stones and other and all types of like commodities), paper money, possessory money, sports memorabilia, musical instruments, costumes, entertainment memorabilia, scientific and engineering memorabilia, maritime objects, wartime objects, transportation objects, arms and armatures, antiquities, governmental collections and archives, private historical properties, governmental real property and monuments, school and institutional assets, auction and consignment assets, private collections, library assets, and other valued public and private collectibles. An "art asset" has a different definition from "work of art." Although the systems and methods described herein are generally described with reference to one or more "works of art," it should be understood that the systems and methods described herein may apply equally to one or more "art assets." (Alternatively, in some instances, the systems and methods described herein may be generally described with reference to one or more "art assets," and it should be understood that the systems and methods described herein may apply equally to one or more "works of art.")

A "category" of one or more works of art may comprise one or more of a genre, historical time period, style of art, color scheme of art, a field of art (e.g., sculpture, painting, photography, pottery, music, ballet, literature), or other category that can be applied to art. In one example, a single category of art may apply to a portfolio of works of art by the same artist or by a group of related artists (e.g., artists of the same time period, country, other geographical unit, philosophy, or other category).

A work of art, art asset, or piece of art that is "possessed" by a participant or user is a work of art that located on premises owned or controlled by the participant or otherwise possessed (but not necessarily owned) by the participant. A work of art may be both possessed and owned by an entity such as a participant.

An "aggregate value" of a portfolio of works of art is a total value, average value, or other metric that reflects a value, such as a market value or estimated current or future market value of a group of works of art.

As used herein, an "ownership entity" may comprise a personal or individual ownership entity, e.g., when a human person owns a shirt or a house, or a non-individual "legal ownership entity." As used herein, a "legal ownership entity" means a corporation, partnership, trust, business, company (e g , limited liability company), or other entity that exists separately from a human person (even though it may be ultimately owned by one or more human persons). For example, Joe Smith may be the legal owner of a farm, while "Joe Smith LLC" (a farming company owned by Joe Smith) may be the legal owner of a tractor that is used to do work on the farm.

An "exchange-traded fund" ("ETF") is an investment vehicle traded on stock exchanges, much like stocks. An ETF may hold assets such as stocks, bonds, and/or one or more works of art or art assets, and the ETF may trade at approximately the same price as the net asset value of its underlying assets over the course of the trading day. To investors, ETFs may be attractive as investments because of their low costs, tax efficiency, and stock-like features. ETFs may offer public investors an undivided interest in a pool of securities and other assets and thus are similar in many ways to traditional mutual funds, except that shares in an ETF can be bought and sold throughout the day like stocks on a securities exchange through a broker-dealer.

ETFs are typically structured for tax efficiency and can be more attractive than mutual funds. In the U.S., whenever a mutual fund realizes a capital gain that is not balanced by a realized loss, the mutual fund must distribute the capital gains to its shareholders. This can happen whenever the mutual fund sells portfolio securities, whether to reallocate its investments or to fund shareholder redemptions. These gains are taxable to all shareholders, even those who reinvest the gains distributions in more shares of the fund. In contrast, ETFs are not redeemed by holders (instead, holders simply sell their ETF shares on the stock market, as they would a stock, or effect a non-taxable redemption of a creation unit for portfolio securities), so that investors generally only realize capital gains when they sell their own shares or when the ETF trades to reflect changes in the underlying index. In most cases, ETFs are more tax-efficient than conventional mutual funds in the same asset classes or categories.

ETFs may trade like stocks. Since ETFs typically trade on the market, investors can carry out the same types of trades that they can with a stock. For instance, investors can sell short, use a limit order, use a stop-loss order, buy on margin, and invest as much or as little money as they wish (there is typically no minimum investment requirement). Also, many ETFs have the capability for derivatives such as options (puts and calls) to be written against them. Covered call strategies allow investors and traders to potentially increase their returns on their ETF purchases by collecting premiums (the proceeds of a call sale or write) on calls written against them. An ETF is continually priced throughout the day and therefore allows users to react to adverse or beneficial market conditions on an intraday basis. This stock-like liquidity allows an investor to trade the ETF for cash throughout regular trading hours, and often after-hours on ECNs. ETF liquidity varies according to trading volume and liquidity of the underlying securities, but very liquid ETFs typically can be traded pre-market and after-hours with reasonably tight spreads.

DETAILED DESCRIPTION OF EXEMPLARY EMBODIMENTS

Traditionally, works of art are appraised by appraisers and sold in auctions and private party transactions.

In various embodiments of the present invention, an apparatus comprising at least one processor and a memory is provided. The memory stores a database. The database associates each of a plurality of portfolios of art with a corresponding one of a plurality of users. Each portfolio of art comprises one or more works of art. The database also associates a respective value for each of the plurality of portfolios of art with each of the plurality of users. The database also associates a respective quantity with each of the plurality of users, in which the plurality of portfolios of art collectively compose a plurality of works of art. The plurality of users comprises a first user, a second user, a third user, and a fourth user. The memory also stores instructions which, when executed by the at least one processor, direct the at least one processor to perform the following method according to an embodiment of the invention.

The respective value for each of a plurality of portfolios of art is determined The respective values are stored in the database. A total value of the plurality of portfolios of art is determined based on each determined respective value of each of the plurality of portfolios of art. For each of the plurality of users, a respective quantity is determined based on a ratio of (1) the determined value of the respective portfolio of art associated with the user to (2) the total value. The respective quantities determined for each of the users are associated in the database at an initial time with (1) the respective user associated with the quantity and (2) the respective value determined for the respective portfolio of art. An indicia of the respective quantity determined for the user is transmitted to each of the users. A first request to receive at least one of the plurality of works of art at a first location that is designated by the first user is received from the first user. After receiving the first request from the first user, a determined value of the at least one of the plurality of works of art is compared with the quantity determined for the first user. After the step of comparing, it is determined that the first request is approved. After determining that the first request is approved, an instruction directing that the requested at least one of the plurality of works of art be delivered to the first location is transmitted. A second request to redeem for a payment at least a portion of the quantity associated with the second user is received from the second user. After the initial time and after receiving the second request from the second user, a current value of the quantity associated with the second user is determined The current value is different from the value associated with the second user in action (e). A current value of the at least portion of the quantity associated with the second user is determined based on (1) the at least portion of the quantity associated with the second user and (2) the current value of the quantity associated with the second user. A payment amount is determined based on the determined current value. An instruction directing that the payment amount be transferred to an account of the second user is transmitted. The stored quantity associated with the second user is decreased by the at least portion of the quantity associated with the second user. A third request to transfer at least a portion of the quantity associated with the third user to the fourth user in exchange for a quantity of funds from the fourth user is received from the third user. Responsive to the third request, the stored quantity associated with the third user is decreased by the at least portion of the quantity associated with the third user. Responsive to the third request, the stored quantity associated with the fourth user is increased by the at least portion of the quantity associated with the third user. Responsive to the third request, the quantity of funds is transferred from an account of the fourth user to an account of the third user. Responsive to the third request, the quantity of funds is associated in the database with a quantity equal to the at least portion of the quantity associated with the third user.

In various embodiments of the present invention, an apparatus comprising at least one processor and a memory is provided. The memory stores instructions which, when executed by the at least one processor, direct the at least one processor to perform several actions, including the following. A value for each of a plurality of portfolios of art owned by a plurality of participants is determined Each portfolio of art comprises one or more works of art. Each portfolio of art is owned by a respective participant. Ownership interests of the plurality of portfolios of art are pooled in a legal ownership entity having an initial total number of shares. For each participant, an initial participant value is determined based on the determined value of each portfolio of art owned by the respective participant. A respective quantity of shares of the legal ownership entity to each respective participant is determined based on the participant value determined for the participant. An indicia of the respective quantity of shares is transmitted to each respective participant. In some embodiments, the portfolio of art consists of one or more works of art. For example, the portfolio of art may be at least two works of art.

In some embodiments, the quantity of shares issued to a respective participant divided by the total initial quantity of shares may be substantially equal to the participant value determined for the respective participant divided by the sum of the initial participant values for each of the plurality of participants.

In some embodiments, after issuing the quantity of shares, the instructions may further direct the at least one processor to receive a request from a user to contribute at least one work of art to the legal ownership entity.

In some embodiments, the instructions may further direct the at least one processor to perform some or all of the following additional actions. A value for the at least one work of art may be determined. An ownership interest of the work of art may be pooled in the legal ownership entity. An initial participant value for the user may be determined based on the determined value of the at least one work of art. An indicia of a quantity of shares of the legal ownership entity may be transmitted to the user based on the initial participant value determined for the user. Upon issuance of the quantity of shares to the user, the quantity of shares issued to the user divided by the total number of shares in the legal ownership entity may be proportional or substantially proportional to the initial participant value divided by a determined total value of the legal ownership entity.

In some embodiments, the act of pooling the ownership interest of the work of art in the legal ownership entity may comprise causing by the at least one processor the ownership interest to be pooled in the legal ownership entity.

In some embodiments, the instructions may further direct the at least one processor to perform some or all of the following additional actions. A specific one of the plurality of works of art may be offered for sale. A plurality of bids for the specific work of art may be received from a plurality of bidders. The specific work of art may be sold to a specific one of the plurality of bidders at a price of a bid of the specific bidder.

In some embodiments, it may be "cheaper" for a user to renew a currently possessed work of art (e.g., to renew possession for another six months) than it is to possess a work of art that is not currently in the user's possession. For example, a current holder may receive a bonus number of bidding points for bids on a currently possessed work of art. Such "bonus" may reflect the cost of shipping the art to another address.

In some embodiments, the act of determining a value for each portfolio of art comprises estimating by the at least one processor a current market price of at least one of the works of art in the portfolio.

In some embodiments, the plurality of participants comprises a first participant and the plurality of portfolios of art comprises at least one first work of art possessed by the first participant and at least one second work of art. The instructions may further direct the at least one processor to perform some or all of the following additional actions. A request for the at least one second work of art may be received from the first participant. A first art allotment value for the first participant may be determined based on a quantity of shares in an account of the first participant. A first present value may be determined for the at least one first work of art and a second present value for the at least one second work of art. It may be determined that the first allotment value is at least as large as the sum of the first present value and the second present value. Based on determining that the first allotment value is at least as large as the sum of the first present value and the second present value, the processor may transmit to the first participant a confirmation that the at least one second work of art will be transferred to the first participant.

In some embodiments, the plurality of participants may comprise a first participant and the plurality of portfolios of art comprises at least one first work of art possessed by the first participant and at least one second work of art. The instructions may further direct the at least one processor to perform some or all of the following additional actions. A request to exchange the at least first work of art for the at least one second work of art may be received from the first participant. A first present value for the at least one first work of art and a second present value for the at least one second work of art may be determined. The first present value may be compared to the second present value. A confirmation that the at least one first work of art will be exchanged for the at least one second work of art may be transmitted to the first participant.

In some embodiments, the plurality of participants comprises a first participant and the plurality of portfolios of art comprises at least one first work of art possessed by the first participant. The instructions may further direct the at least one processor to perform some or all of the following additional actions. A first art allotment value for the first participant may be determined based on a quantity of shares in an account of the first participant. A total value of any works of art in the plurality of portfolios that is possessed by the first participant may be determined. A first allotment credit value may be determined based on a difference between the first art allotment value less the total value.

In some embodiments, the instructions may further direct the at least one processor to perform some or all of the following additional actions. A request to transfer at least a portion of the first allotment credit value to a user may be received from the first participant. Based on the request, the portion of the first allotment credit value may be transferred from an account of the participant user to an account of the user. The account may be stored in a database electronically coupled to the at least one processor.

In some embodiments, the user may be one of the plurality of participants.

In other embodiments, the user may not be one of the plurality of participants. In some embodiments, the instructions may further direct the at least one processor to create by the at least one processor an account of the user in a database electronically coupled to the at least one processor.

In some embodiments, the instructions may further direct the at least one processor to perform some or all of the following additional actions. A plurality of bids to purchase at least one share of the legal ownership entity may be received. Each bid may specify a bid price and a quantity of shares of the legal ownership entity. A plurality of offers to sell at least one share of the legal ownership entity may be received. Each offer may specify an offer price and a quantity of shares of the legal ownership entity. At least one bid may be matched with at least one offer. A trade of a trade quantity of shares may be executed at a trade price based on the matching.

In some embodiments, the instructions may further direct the at least one processor to perform some or all of the following additional actions. An exchange-tradable fund (ETF) comprising a plurality of shares may be created. The ETF may have a value that tracks a market value of the legal ownership entity. An indication that a user has paid an amount for at least one share of the ETF may be received. An indicia of ownership of the at least one share may be transmitted to the user or an agent of the user based on the indication.

In some embodiments, the instructions may further direct the at least one processor to perform some or all of the following additional actions. A current value of each of a subset of the plurality of works of art may be determined. The subset may have a rating in at least one second category. A current value of each of the subset of the plurality of works of art may be determined. An aggregate value of the subset of the plurality of works of art may be determined. An exchange-tradable fund (ETF) comprising a plurality of shares may be created. The ETF may have a value that tracks the aggregate value of the subset of the plurality of works of art. One or more shares of the ETF may be caused to be traded on an electronic exchange in electronic communication with the at least one processor.

In some embodiments, shares in the art exchange may comprise shares in an ETF.

In some embodiments, the entity that owns works of art, distributes shares to users, and performs other functions described herein may comprise an ETF. The ETF may own assets comprising one or more works of art (e.g., works of art received from users), and the ETF may distribute shares in the ETF such that shareholders of the ETF own fractional interests in the ETF, which owns the works of art of users. In some embodiments, the shareholders may be users who temporarily possess one or more of the works of art owned by the ETF.

In some embodiments, the ETF may comprise an entity separate from another entity that owns the works of art.

In various embodiments of the present invention, an apparatus comprising at least one processor and a memory is provided. The memory stores instructions which, when executed by the at least one processor, may direct the at least one processor to perform several actions, including the following. Rating information about at least one category for each of a plurality of works of art may be received. The plurality of works of art may comprise at least one first work of art and a second work of art. The rating information may comprise at least one first rating in at least one category for the at least one first work of art and a second rating in the at least one category for the second work of art. Each category may comprise at least one of a genre of art, historical time period, style of art, an artist, a medium of art, a color scheme of art, and a field of art. A determined value of the at least one first work of art may be received. A current value of a second work of art may be determined based on the rating information and the determined value.

In some embodiments, the determined value may be an appraisal value determined by an art appraiser.

In some embodiments, the instructions may further direct the at least one processor to perform some or all of the following additional actions. Subsequent rating information concerning the second work of art may be received after determining the current value of the second work of art. The subsequent rating information may comprise at least one third rating in at least one category for the second work of art. The at least one category may comprise at least one of a genre of art, a historical time period, a style of art, an artist, a medium of art, a color scheme of art, and a field of art. An updated value of the at least one second work of art may be determined based at least in part on the determined current value and the subsequent rating information.

In some embodiments, an apparatus comprising at least one processor and a memory is provided. The memory stores instructions which, when executed by the at least one processor, may direct the at least one processor to perform several actions, including the following. Rating information about at least one category for each of a plurality of works of art may be received. The plurality of works of art may comprise at least one first work of art and a second work of art. The rating information may comprise at least one first rating in at least one category for the at least one first work of art and a second rating in the at least one category for the second work of art. Each category may comprise at least one of a genre of art, historical time period, style of art, an artist, a medium of art, a color scheme of art, and a field of art. A determined value of the at least one first work of art may be received. A current value of a second work of art may be determined based on the rating information and the determined value. In some embodiments, the determined value may be an appraisal value determined by an art appraiser.

In some embodiments, the instructions may further direct the at least one processor to perform some or all of the following additional actions. A current value of each of a subset of the plurality of works of art may be determined. The subset may have a rating in at least one second category. A current value of each of the subset of the plurality of works of art may be determined. An aggregate value of the subset of the plurality of works of art may be determined. An exchange-tradable fund (ETF) may be created comprising a plurality of shares. The ETF may have a value that tracks (e.g., is equal to) the aggregate value of the subset of the plurality of works of art. One or more shares of the ETF may be caused to be traded on an electronic exchange in electronic communication with the at least one processor. In some embodiments, the determined value may be an appraisal value determined by an art appraiser.

In some embodiments, the instructions may further direct the at least one processor to perform some or all of the following additional actions. After determining the current value of the second work of art, subsequent rating information concerning the second work of art may be received. The subsequent rating information may comprise at least one third rating in at least one category for the second work of art. The at least one category may comprise at least one of a genre of art, historical time period, style of art, an artist, a medium of art, a color scheme of art, and a field of art. An updated value of the at least one second work of art may be determined based at least in part on the determined current value and the subsequent rating information.

In some embodiments, a centralized Art Exchange entity may own or possess a centralized collection of art contributed by users. Users may receive shares, "points," or other portion of an interest (e.g., ownership interest) of the Art Exchange in exchange for the art they contribute. (It should be appreciated by one of ordinary skill in the art that while shares and points are used herein as examples of an interest such as an ownership interest in an entity, any other type of interest may be used.) Shares/points may have a value based on the user's contribution. For example, ten shares of the Art Exchange may be issued for $1000 of art. If the user has 2000 shares ($2 million), the user may be entitled to have in the user's possession $2 million of art from the Art Exchange at any one time. In this manner, users may effectively use their shares to "rent" art from the Exchange. Shares may be pooled among groups of people and loaned to others. In some embodiments, shares may have an associated "point value" per year. Users may spend points to "rent" art up to their effective share value. Alternately, users may rent art more expensive than their contributed value, but only for a short period of time (e.g., $1 million of art for one year is equivalent to $2 million of art for six months). Similarly, in some embodiments, users may save up their points to "rent" more expensive art. For example, a user having 500 shares (and therefore is entitled to $500,000 of art at a given time) may abstain from renting any art for two years and then rent art worth $1.5 million in a third year.

In some embodiments, a process for "renting" one or more works of art may operate in a manner similar to a vacation property time share exchange, wherein users exchange their time share for points which they can apply toward another time share in the centralized exchange (e.g., wherein a user can exchange his "2-bedroom in Hawaii for a week in July" for another user's "3-bedroom in Milan for four days in August"). Accordingly, shares/points in the Art Exchange may be used to "rent" up to the user's share value of art from the Exchange. In this way, a wealthy art collector can contribute his collection of Picasso paintings for shares of the Exchange, and then use his points to "rent" (or "time share") a collection of Rembrandts. Later, the art collector can exchange the Rembrandts the following year for a collection of Rodin sculptures. The art collector potentially could later "re-rent" the collection of Picasso paintings he had contributed previously.

In some embodiments, an Art Exchange (e.g., comprising at least one processor and memory as described herein) may provide ownership shares of a legal entity in exchange for one or more works of art. (It should be appreciated that as used herein, an "art exchange" may refer to one or more computer systems that implement various features described herein for an art exchange, and/or the term may refer to a legal entity that performs various features related to an art exchange as described herein.)

In some embodiments, an art fund may be implemented according to a system and method for selectively providing stock shares that entitle rights to use one or more works of art (e.g., as described for rights to use a property in U.S. Ser. No. 10/190,442). A management entity may oversee and selectively schedule use of the one or more works of art according to individual stock shares in the art fund. In one embodiment, the use may be the dividend provided to the stockholder. In another embodiment the use schedule may be created by receiving use requests from stockholders and scheduling use of the one or more works of art according to which stockholder first requested the one or more works of art for the scheduled use period. In another embodiment, a lottery system may be used to assign use dates or periods to the individual shareholders. In yet another embodiment, preference to use dates/periods is made based on the number of stock shares or the type of stock shares (e.g., shares of a preferred stock) owned by the stockholder. Stock shares are exchanged at a public or electronic exchange.

U.S. patent application Ser. No. 09/864,743 Filed May 24, 2001:

In some embodiments, a system of the present invention may register an art asset owner using any of a variety of systems and methods (e.g., as described, with respect to timeshare intervals, for registering an asset owner with an asset converter in U.S. patent application Ser. No. 09/864,743 filed May 24, 2001).

For example, an asset owner (e.g., an owner of an asset such as a work of art, other art asset, or other asset as described herein) may buy or otherwise acquire, e.g., via traditional means, from an asset holder an asset, such as an art asset. In some embodiments, the asset may be an art asset that is determined by the system to be an art asset eligible for participation in the art exchange, e.g., as determined based on rating information such as value information (e.g., sale price of the asset). In the context of art assets, the asset owner may acquire a specific art asset from an art seller (such as an art gallery). As part of an exemplary standard usage procedure, the system may provide the asset owner with an identity number ID and a password for accessing the system, and/or the art asset owner may register online on his or her own. After obtaining the ID and the password the asset owner may enter personal information, and possibly change the password given by the system. Next, the asset owner may submit art asset information (e.g., more detailed information about the art asset, such as title, date, artist, and other rating information) to the system, e.g., online or via other networked communication. The system may validate art asset information in real-time against information provided by the art seller or other source of rating information about the art asset. If the information does not match, the art asset owner may be notified, and the information routed to the asset intermediary for verification or correction. When the asset information is verified to match or substantially match with that stored in the database of the art seller or other intermediary, the asset owner may be asked (e.g., online) to pay for a usage fee for the system in order to activate his or her membership with the art exchange. Once the asset owner's payment is verified, his personal and asset information may be forwarded and stored in an asset owner's database with the system. Thereafter, the asset converter may send ownership and/or membership confirmation information to the asset owner via a communication link The preceding may constitute an exemplary registration procedure for enrolling the asset owner as a participant in an asset exchange such as an art exchange according to an embodiment of the invention.

In some embodiments, an asset such as an art asset may be rated by a person or automatically by the system (e.g., as described, with respect to timeshare intervals, for assigning points or tokens to a particular asset in U.S. patent application Ser. No. 09/864,743 filed May 24, 2001). For example, an asset may be rated transparently in accordance to asset-based points according to a plurality of composite inputs. Using an art asset as a concrete example, the basic asset feature of a particular characteristic of the asset (e.g., last purchase price, artist, time period, medium, etc.) is given a certain number of points (e.g., 100 points for paintings from the Romantic period, 1000 points if the artist is Monet or 1500 for Rembrandt, 500 points for a painting of a certain size, 800 points for a sculpture of a certain size, etc.). The art asset's features may also be rated and given a certain number of points or tokens. Finally, the thematic experience of the asset may be rated in accordance with a points-based or token system. The points for each characteristic may be aggregated to derive the number of points assigned to the asset (e.g., as an initial default value). The initial asset base points may be measured against members' feedback and multiplied with a factor. The asset base point and the member feedback are further adjusted for a weightage factor asset co-efficient. The mechanics of deriving the asset co-efficient where country location co-efficient and popularity factor of asset are two key components of this factor.

Rating and value information (e.g., points) may be determined for a particular asset based on market forces, e.g., based on bids from users of the system. For example, users may have a number of "usage points" based on the value of art they have contributed, and they may bid their usage points to "rent" a particular asset (such as a particular painting). Rating information may be determined from a winning bid. Pricing and bidding may be conducted and/or determined in accordance with any auction or market method, such as a stock exchange (NYSE or Nasdaq), ebay, or other auction or pricing mechanism.

Various embodiments of the present invention relate to providing stock shares having associated rights to a collection of assets such as art assets. (E.g., various embodiments may have features similar to those described for rights use cruise ships as described in U.S. patent application Ser. No. 10/696, 542 filed Oct. 29, 2003.) For example, various embodiments of the present invention relate to systems and methods for providing stock shares that represent ownership in at least a portion of one or more art assets by an entity, wherein the dividend of the stock shares entitles the stockholder rights to use one or more of the assets (e.g., to possess a specific asset for a period of time). The stock shares may be issued to users in exchange for money or assets contributed to the asset exchange (which become eligible for use by other users).

Implementation of the present invention may take place in association with the creation of stock shares that represent ownership in an entity that has ownership in one or more assets such as art assets. The entity may issue use rights to possess the art assets as an annual (or semiannual or other time period) dividend which may be issued in the form of points, credits, money, or some other representation of value that can be redeemed for the right-to-use the asset, or the rights can be accrued through another mechanism such as ownership in the asset exchange or directly through purchase of the stock (e.g., shares of the asset exchange sold directly to a shareholder, or purchase of such shares on an open market, e.g., via a stock exchange).

In one embodiment, use rights are provided as a stock dividend. The stock shares may be issued by an entity that has ownership in one or more assets, and may be marketed through one or more brokers (e.g., art brokers or other third parties) and sold privately or publicly. Customers of the brokers purchase the stock shares and receive dividends, which allow utilization of the assets.

In a further embodiment, a management entity may oversee and selectively schedule use of the assets (e.g., possession of the art assets) according to benefits such as dividends declared. For example, in one embodiment, the use schedule is created by receiving use requests from stockholders and scheduling use of specific assets owned by the asset exchange according to which stockholder first requested the property for the scheduled date(s). In another embodiment, a lottery system is used to assign use dates or periods to the individual stockholders. In yet another embodiment, preference to use dates/periods is made based on the number of stock shares owned. Furthermore, in another embodiment, a preferred stock is issued to provide a preference in using the assets (or for using one or more specific high-value assets).

Implementation of various embodiments of the present invention may embrace the use of fixed, floating, and/or rotating techniques for providing use of assets.

Another embodiment of the present invention disseminates "points" or "credits" for stock ownership. The points or credits may be convertible into use rights for the assets. For example, an owner could save points for several years and then redeem the points for using a high-value painting for two years. The points could alternatively be redeemed for using several lower-value works of art for six months.

Implementation of various embodiments of the present invention may embrace the exchange of stock shares by individuals. In one embodiment, the exchange may take place through a public exchange. In another embodiment, the exchange may occur over a computer network, such as the Internet, as discussed herein.

In some embodiments, the Art Exchange may determine a value of a work of art (e.g., a market price of the art) using any of several methods as described herein (and/or as known in the art).

In some embodiments, points/shares of the Art Exchange may also be sold on the open market. The price paid for points/shares determine a current market price for points/shares, which thus indicates the market value of the entire Art Exchange (i.e., the price of all shares may be extrapolated from the price of one share).

In some embodiments, users may bid points on works of art. A "price" of the work of art may be determined based on the winning bid and the market price per point. (For example, if a user bids 1 million points on a Da Vinci painting, and each point is worth $10, then the system may determine a current market value of the Da Vinci painting to be 1 million points or $10 million dollars. In other embodiments, prices and point values may be assigned (e.g., by expert art appraisers) to each work of art, and these prices may be periodically updated.

In some embodiments, the art exchange may store a record of all prices/points "paid" in exchange for works of art. The system may track the prices over time. The database may also store rating categories of each work of art, such as the artist, historical significance, style, color scheme, art type (e.g., painting, sculpture, photographs, etc.). Based on the data, the system may determine trends—e.g., that one artist's paintings are rising in value by 10% per year, or that pointalist paintings by French artists in the 1880's are decreasing in price. Based on the data, the system may estimate current and future values of one work of art, e.g., based on prior information about the work of art, and/or based on information about other works of art in a similar rating category.

It should be appreciated that the present invention may be used with any and/or all art assets which are tangible in nature. Representative tangible assets as used in this invention, in one embodiment, include paintings, drawings, sculptures and photographs. In another embodiment, representative assets could also include rare books and manuscripts, historical sites, furniture (antiques) and decorative arts, rare stamps and coins (both rare coins, bullion, precious metals, precious stones and other and all types of like commodities), jewelry, ancient artifacts, pottery and glass, ceramics and other tangible assets. Assets, in still another embodiment, may include any type of coin, gold coins, platinum coins, silver coins, gold dusts, silver dusts, platinum bars, gold bars, genuine gold, karat gold, rubies, emeralds, diamonds, simulated diamonds, genuine platinum, karat platinum, paintings, precious metal, precious alloys, precious metals, precious ores or concentrates, antique coins, and rare coins, for example.

As those of skill in the art will appreciate, an art asset may comprise a single asset (such as a sixteenth century gold coin), or may be combined (or, pooled) with other art assets (such as sixteenth, seventh and eighteenth century gold coins), whether or not similar in nature (such as, for example, sixteenth, seventh and eighteenth century gold coins combined with sixteenth, seventh and eighteenth century paintings). Thus, the present invention allows for inventive adaptability, so that depending upon user input, each art asset pool will have a unique art asset characteristic which may be desired by art asset investors.

In some embodiments, the systems and methods herein may be applied equally to jewelry, and/or to jewelry in combination with one or more categories of art such as paintings and sculptures. (Conversely, the features described herein for jewelry may be applied to other items described herein, such as paintings and other works of art). For example, jewelry (and/or one or more art assets) may be pooled in a jewelry exchange, rated, and priced according to the systems and methods described herein. For example, owners of various valuable jewels may pool their jewelry together in a Jewelry Exchange, in which each contributor to the exchange receives shares of the exchange in return for the contributed jewelry. The Jewelry Exchange may become the legal owner of the jewelry. The ownership shares of each contributor may entitle the contributor to possession of a portion of the jewels. The time and value of possession may be determined according to one or more algorithms, as described herein. For example, a contributor may be entitled to possess, at any given time, a value of jewels equal to the value of the jewels contributed by that user (e.g., as valued at the time of contribution, or using a current value of contributed items).

In some embodiments, the Art Exchange may be used to sell a work of art for an owner, e.g., in a manner similar to an art gallery selling an owner's art on consignment. (When an art gallery sells art on consignment, the gallery typically charges a fee or takes a percentage of the sale proceeds.) In the Art Exchange, a user may exchange a work of art for points/shares, and then sell those points/shares on the open market. In another embodiment, the Art Exchange may accept the work of art into the Exchange on a consignment/temporary basis (without giving shares or points to the owner), and enable users to bid cash or points/shares (or cash plus some points/shares) for the work of art. The user can decide to accept a highest bid, or continue to wait for a desired bid. During this process, different users (e.g., interested buyers) may "rent" the art on a trial basis. (For example, works of art may be shipped from user to user, or from users to a central storage facility that "rents" out the art as it is requested by users.) In some embodiments, users of the Art Exchange may vote on whether the Art Exchange should purchase the art from the seller (e.g., after "renting" the art on a trial basis). To fund the purchase of the work of art, the Art Exchange may issue more shares on the open market in exchange for cash, sell some of its art assets, and/or raise additional funds from users.

In some embodiments, an ETF may be created based on the art exchange. For example, in a manner similar to how an ETF may be created to mirror a particular index (such as the Dow Jones Industrial Average), an ETF may be created to mirror the underlying assets of an Art Exchange that owns a large portfolio of art (e.g., art contributed by various users who possess the art). In some embodiments, the ETF may be created to mirror the Art Exchange as a whole, i.e., the value of the Art Exhange as a private enterprise (e.g., taking into account balance sheets, profit/loss statements, etc.) In some embodiments, the Art Exchange may be a public company, and public filings (such as 10Q's and 10K's) may be examined. In some embodiments, the Art Exchange may be a privately held company that may provide limited information to the public.

In some embodiments, the Art Exchange may be traded as an ETF (exchange traded fund), e.g., on an exchange, wherein shares can be bought and sold on the stock market. For example, users of an exchange may buy and sell ownership interests (such as shares) of the ETF.

It should also be appreciated that users of an electronic exchange (e.g., users of the Art Exchange) may buy and sell ownership interests of the Art Exchange. For example, a user owning 100 shares (e.g., out of 1 million total shares) may sell all or a portion of the shares to another person. The right to possess art may be transmitted (e.g., in a pro rata fashion) to any new owners. Entities may also buy shares of the art exchange directly from the art exchange (e.g., the art exchange may issue shares to an entity such as an individual in exchange for cash or other value (e.g., besides one or more works of art).)

In other embodiments, one or more systems comprising hardware and software for accomplishing these methods is provided.

FIG. 1. Exemplary System

Some embodiments of the present invention provide systems and methods for providing an art exchange.

The system 100 may comprise one or more servers 2 coupled to one or more databases 80, one or more data providers 8a-8n, one or more end users 10a-10n, and one or more agents 12. The data providers 8a-8n, users 10, agents 12, and server 2 may each communicate with each other. Users 10 may also communicate with other users 10, e.g., regarding art or an art rating.

Server 2 may comprise one or more processors, computers, computer systems, computer networks, and or computer databases. Server 2 may comprise modules 18-64. Server 2 may also comprise one or more databases, such as databases 80. Server 2 may communicate with users 10, data providers 8, and agents 12. For instance, server 2 may communicate with a user 10 computer, such as a browser of a user computer, e.g., over the internet.

Databases 80 may comprise one or more processors, computers, computer systems, computer networks, and/or computer databases configured to store information. Each of databases 80 may communicate with server 2, e.g., via one or more modules of server 2. For instance, server 2 and modules may store information in databases 80 and may also use information stored in databases 80.

Users 10a-10n may comprise one or more human persons. Users may rate art, contribute art to the art exchange, purchase or rent or lease art from the art exchange, buy or sell ETFs related to one or more works of art owned by the art exchange, provide rating and value information pertaining to one or more works of art, and/or or otherwise interact with one or more other users, server, or data providers, or other elements of system 100. Users 10 may provide or receive information related to a work of art or a rating or ETF associated therewith. Users 10 may interact with agents 12, server 2, and/or other users 10 to rate art, contribute art to the art exchange, purchase or rent or lease art from the art exchange, buy or sell ETFs related to one or more works of art owned by the art exchange. As used in this application, users 10a-10n may also refer to a user's interface to other system 100 components (like server 2), such as a user's PDA or computer or a program running on a user's computer such as a computer web browser like Internet Explorer™, which may communicate with data providers 8, agents 12, and/or server 2.

Data provider(s) 8 may comprise any person, processor, information service, or other entity that publishes or otherwise provides information concerning one or more works of art, such as a value (e.g., a price of a work of art or an ETF or underlying asset thereof) to server 2, users 10, and/or agents 12. For example, a data provider 8 may comprise an art appraiser, data feed, ETF price provider (e.g., entity that provides real-time price updates and stock ticker information), data service, website, or other source of information relevant to a work of art. The information may comprise information about one or more works of art. The data may also comprise historical information about one or more works of art, such as historical price information concerning a specific work of art or category of art. In some embodiments, the data may include information that may be relevant to pricing or rating a work of art. In some embodiments, the data may include information that may be of interest to a user 10 or server.

Data provider 8 may provide art information in real time, as information first becomes available to the general public, or at another time. Data provider 8 may provide such information in any one or more of a variety of forms and means such as video, audio (e.g., radio broadcast), text (e.g., stock ticker-type information), or other data that may convey information concerning one or more works of art or an art exchange. Data may be provided at a variety of different timings. In some embodiments, data may be provided in periodically, continuously, or continually, e.g., via a data feed (e.g., a stream of data that includes real time updates of event information, such as a running commentary of a game in text or audio format). In some embodiments, data may be provided after an event, e.g., an independent art appraisal.

In some embodiments, data provider 8 may provide to server 2 (and/or agents 12 and/or users 10) information about a plurality of different works of art (or jewelry, art asset, etc.). For example, data providers 8 may provide information regarding a date of creation, artist, historical style, color and style information, and other information (such as category information) about the work of art.

Agents 12 may be art appraisers or agents of users 10, e.g., purchasing agents for acquiring an interest in one or more works of art or one or more shares of the art exchange. Agents 12 may determine a rating or value of one or more works of art and provide such rating and/or value information to one or more other entities in the system such as server or users.

The server 2 may comprise a computer, server, hub, central processor, or other entity in a network, or other processor. The server 2 may comprise input and output devices for communicating with other various system 100 elements. In some embodiments, the server 2 may comprise an art exchange.

In some embodiments, the server 2 may be comprised in an end user's computer 10, e.g., as a toolbar in a user's web browser or another program running on the user's computer.

As shown in FIG. 1, the server 2 may comprise a plurality of modules, such as modules 22-34. Each module may comprise a processor as well as input and output devices for communicating with other modules, databases, and other system elements.

User interface module 22 may communicate with users. User interface module may communicate with users so that users can set up an account, log in to an account; prompt a user to submit preferences concerning one or more works of art; receive user preferences and selections concerning one or more works of art; communicate with users to provide information regarding one or more works of art.

User interface module 22 may cause information to be output to a user, e.g., at a user output device such as a display device (e.g., a display device at a user terminal), a speaker. The information outputted to a user may be related to a user account, one or more works of art, preferences, and other information described herein. User interface module may communicate the information electronically, e.g., via networked communication such as the internet (e.g., in an email or webpage), telecommunication service, etc. In some embodiments, user interface module 22 may comprise input devices for users to information about one or more works of art, such as a request for one or more specific works of art, rating information about one or more works of art, pricing information (e.g., a bid or offer concerning one or more works of art or one or more shares or other interests in an ETF or other art ownership vehicle), and other information.

User preferences module 24 may receive, identify, or determine user preferences concerning one or more works of art. For instance, the module may receive the preferences from a user interacting with a user interface. The module may also receive them from an automated user terminal. The module may also determine them based on a program that automatically determines user preferences concerning one or more works of art and/or portfolios of art. User preferences may include preferences and other information that are related to, or that specify, any of the following with respect to one or more works of art: value information (e.g., historical price information such as an appraisal conducted five years ago and a recent auction price of the work of art); artist; style; historical period; color scheme; medium; time and location information (such as a preference to receive works of art at a summer home during the summer); shipping preferences (e.g., ship via FedEx with insurance up to a specified amount).

Financial information module 26 may determine financial information associated with one or more ETFs associated with one or more works of art and/or an art exchange. For example, financial information module may determine a value of the works of art in an art exchange and determine a value of an ETF that is associated with (e.g., that is intended to mirror or track a value of) an art exchange.

Payment module 28 may determine a payment (e.g., to be paid to or received by a user or server) for rights associated with one or more works of art. For example, payment module may determine an amount (e.g., in dollars and/or points) to be paid for the use of a particular user's points in the art exchange (e.g., that entitles the user to receive $1 million of art work at any given time based on an earlier contribution by the user of $1 million of art to the art exchange).

Parameters module 30 may determine rating information, parameters, or other criteria associated with one or more works of art. For instance, parameters module may determine search parameters for finding one or more works of art that satisfy one or more user preferences and/or other criteria. For example, parameters module 30 may determine rating information for one or more works of art (e.g., a historical time period of a specific work of art, such as "Romantic period" or "Renaissance") based on other rating information or other information associated with one or more other works of art (e.g., a date a work of art was created, name of artist, a time period ascribed to other works of art by the same artist, etc.).

Art search module 32 may search for and identify one or more works of art based on one or more parameters. For instance, art search module may search one or more financial databases (e.g., a database that stores information relating to a plurality of works of art), e.g., via the internet, to determine one or more works of art that satisfy one or more parameters, such as parameters based on preferences from a user.

Price module 34 may determine and associate one or more values or prices with one or more works of art. For instance, price module may determine a price or value (such as a net present value) for a portfolio of works of art. Prices may include a current price, a historical price (e.g., a price such as a market price at a prior time, such as a week earlier or an original date of creation of a work of art), and an estimated future price (e.g., based on changing price information, such as a recent increase or decrease in a value of works of art by a specific artist over a recent period of time).

Databases

As shown in FIG. 1, a database 80 may be coupled to the server 2. The database 80 may comprise a plurality of databases as described below. Databases 80 may store information about users, elements, and other information.

The modules may function separately or in various combinations. While the modules are shown within a single server, the modules may also operate among several servers. The modules may communicate with a plurality of databases, which may also function collectively or separately.

The modules of server 2 may store, access and otherwise interact with various sources of data, including external data, databases and other inputs.

An Exemplary Method

Figure 2:
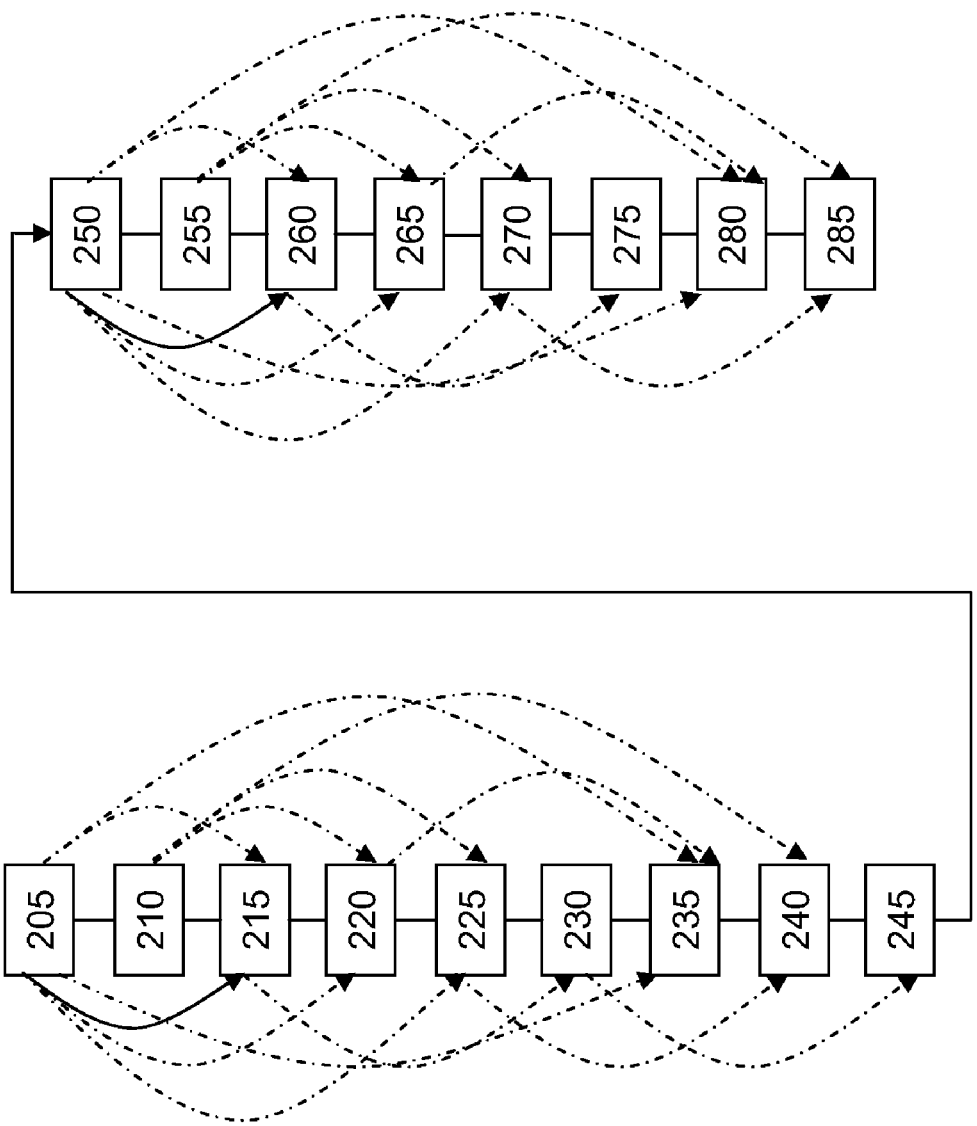
FIG. 2 depicts a flow diagram according to at least one embodiment of the methods disclosed herein.

FIG. 2 depicts a flow diagram according to at least one embodiment of the methods disclosed herein.

It should be understood that each function(s) described for each block may be performed using a module capable of performing that function, e.g., according to methods described for each module above. It should also be appreciated that the acts described in these blocks may be performed in any order (including but not limited to the exemplary orderings shown on the diagram), and not all blocks need be performed.

In block 205, the system 100 (e.g., one or more processors of server) may transmit a request for one or more works of art to one or more users.

In block 210, the system 100 (e.g., one or more processors of server) may receive login information, e.g., from a user. For example, the user may access the system to log in to an account of the user managed by the system. The login information may be any information for use in authenticating a user and providing thereto one or more of the functions disclosed herein. The login information may be, for example, a user ID, password, biometric data, etc. The login information may be submitted by a user with a user interface screen that includes therein at least one form element, such as an input field or text box, a drop down list, check box, radio buttons, action buttons, clickable images, etc., for entering login data. Following submission, the login information may be compared with previously obtained information and access to one or more of the functions may be provided based on a positive match.

In block 215, one or more users may contribute one or more works of art to the system (e.g., to an art exchange system comprising server 2). Legal title of the works of art may be transferred to the system, e.g., in exchange for an interest (such as an ownership interest) in the art exchange (e.g., shares of the art exchange).

In block 220, one or more works of art may be identified. Each work of art may be selected or otherwise identified by one or more users, by the server, or by an agent. Art may be identified based on artist, title, historical period, color scheme, medium, style, and other information.

In block 225, information about the one or more identified works of art may be provided (e.g., by users, data providers, or agents) and/or received (e.g., by server). The information for each work of art may comprise one or more of a volume (quantity), price (original price, current market price, bid or offer price, or other price associated with a work of art), information about the artist (e.g., biographical data such as place of birth, dates of birth and death), associated school of art (of the artist or the work), medium (e.g., canvas, brass sculpture), date of creation, and/or any other parameter that can be associated with a work of art. For instance, a user may provide information about the works of art.

(It should be appreciated that information about a work of art may be identified at any time, e.g., after block 220 or before or after another block such as block 250.)

In block 230, information (e.g., rating and value information) about the one or more works of art may be determined, e.g., by a processor. For example, category information associated with the one or more works of art may be determined, e.g., by a processor (and/or one or more data providers), e.g., based on the received information. For example, server may determine a rating for all works of art by a particular artist based on information received about one or more works of art from that same artist. It should be appreciated that such information may be determined as any new information is received regarding one or more works of art (e.g., one or more works of art that are associated in a database with a work of art for which information may be determined). For example, one or more works of art may be re-rated each time a user bids on a work of art (e.g., a bidding process for a rental or a bidding process for purchase), a work of art is purchased (e.g., via the system or elsewhere in the world using a different purchase system, e.g., an auction at Christie's), or rating or value information is received (e.g., from a user, agent, or data provider).

For example, an art rating may be determined, e.g., by the processor, for one or more of the works of art. For instance, an art rating may be determined for a set of works of art selected by a user and/or the processor. The art rating may be determined based on one or more criteria and/or parameters associated with the one or more works of art, such as category information, historical price information (a prior price paid), current market price of a work of art (e.g., a work of art having similar category information or rating information; projected change in category information (e.g., based on an identified trend that works of art by a particular artist of a work of art have been increasing by a determined amount such as 5% each year for a determined time period such as ten years), expected future market prices, financial information associated with the work of art, and other information that may be relevant to a determination of a rating and/or value of one or more works of art.

Information such as value information, category information, and rating information may be associated, e.g., in a database, with one or more works of art (e.g., one, some or all of the works of art in an art fund). For instance, a present value for each work of art may be determined (e.g., based on historical values, art category and rating information, and other information).

In block 235, interests such as ownership interests may be provided to one or more users who contributed one or more works of art to an art exchange. The interests may comprise shares, points, or other indicia of an interest such as an ownership interest. The interests may have a bundle of rights, e.g., that entitles the contributors to one or more rights in the one or more of the contributed works. The interest may be determined based on a determined value of the art contributed by the contributor, e.g., based on value information (such as a private party appraisal of art contributed by user, a recent auction price of the art, and/or an average of prices estimated by users.)

For example, a contributor may be issued a share of the art exchange for every $1,000 of art contributed by the user (in which the value of the art is determined as described herein, e.g., by a private appraisal). Each share may entitle the user to 10 points per year. The points may be used to bid on the right to possess one or more works of art for a period of time (such as a year, month, week, etc.).

In block 240, one or more users may bid on one or more works of art. The users may comprise those who contributed art to the art exchange. In some embodiments, the users may also comprise individuals who did not contribute art to the art exchange. For example, non-contributing users may purchase bidding points with cash (e.g., U.S. dollars), e.g., at an exchange rate determined based on a valuation of the works of art in the art exchange. For example, if it is determined that the art exchange has total art assets of $100 million and there are 50 million points outstanding, it may determine that one point is worth $2. In some embodiments, contributing users may sell points to other contributors and non-contributing users, e.g., at a rate determined by system or at a private party agreed rate.

As described herein, contributors may bid using points based on the contributor's interest in the art exchange (e.g., based on the contributor's owned "points"). Contributors may bid on the right to possess a specific work of art for a specific period of time.

In block 245, points or shares may be bought and sold. In some embodiments, an exchange (such as a trading platform such as ESPEED™) may be used to buy and sell points and/or shares. For example, the trading platform may match bids and offers (and hits and takes) to buy and sell a specific quantity of shares and points. For example, a user may submit a bid to sell 1000 points for $10,001 dollars, and another user may submit an offer to purchase 500 shares for $5,001 dollars. The system may match the bid and offer and execute an exchange of 500 shares at a price of $5000 dollars (e.g., less a $1 commission per party to the trading platform).

In block 250, value information may be determined based on bidding information (and other information), such as relative value and absolute value information. For example, if one painting was "rented" by a winning bid of 10,000 points and another was "rented" by a winning bid of 20,000 points, then the system may determine information indicating that the second painting is worth twice as much as the first painting. For example, if 20,000 points represents 20% of the total points in the system (representing all works of art in the art exchange) and the system determines that the total value of the art held by the art exchange is $500 million, then the system may further determine that the second painting has a value of $1 million (20% of the total valuation of the art exchange), and that the first painting has a value of $500,000 (half the value of the second painting). The system may update value information over time, e.g., based on new bid and valuation information.

In some embodiments, the system may determine a fixed price associated with one or more works of art. For example, the system may determine that a specific sculpture by Rodin costs 20 points per week of "rental," or 200,000 points (or $200,000 in cash) to purchase permanently. The system may sell points for cash.

In block 255, information about a user may be determined, e.g., based on a user's bids. For example, if one bidder bids on a Picasso painting, then the system may determine information about a user's preferences (e.g., concerning Picasso art, paintings, Picasso paintings, art from a period or category associated therewith, etc.).

In block 260, an exchange-traded fund (ETF) may be created based on the art exchange and the works of art in the exchange The ETF may be created to track the value of the works of art in the art exchange. The ETF may determine value information based on "rental" values of art (e.g., as determined by bids on rentals) and outright purchases and sales of art by the exchange (e.g., when the exchange divests existing art assets and purchases additional art assets).

Shares in the ETF may be traded on an exchange, such as the ESPEED™ platform, NASDAQ, the New York Stock Exchange, or another exchange.

In some embodiments, futures, options, and other derivatives of points, shares in the art exchange or ETF, and/or specific works of art in the art exchange may be exchanged on a trading platform. For example, the right to receive 10 shares of the art exchange (or the corresponding ETF) in five years may be bought and sold on a platform such as ESPEED™.

In block 265, a change in value may be determined, e.g., by the processor, for one or more of the works of art. For example, the system may determine that one work of art that was rented for 10,000 points in a previous year has recently been rented for 20,000 points in a present year. The system may adjust the value accordingly (e.g., by doubling the determined value of that work of art).

In some embodiments, changes in value may be determined based on a change in the value of the ETF. For example, the system may use the ETF as a market valuation of the total art assets of the art exchange. For example, if the art exchange has a total of 1 million shares (each yielding 10 million points per year) and is determined to have a valuation of $500 million in total art assets based on the ETF, then the system may determine that each share is worth $500. The system may also determine a value of each point. The system may value each work of art based on winning bid price, bidding history information, and other information.

In some embodiments, the art exchange and/or users may donate points, shares, and/or art assets to entities such as museums, schools, and other government, non-profit, not-for-profit, or other organizations. In some embodiments, users may take a tax deduction based on the value of the contribution/donation.

The system may determine values for specific works of art (e.g., for rental or purchase) based on valuation information for each specific work of art and valuation information associated with art from a similar category. For example, values may be determined based on ETF valuation information and specific valuation information of a work of art, e.g., based on a bidding history for the work of art.

In block 270, art rating information may be determined for one or more works of art. For example, users, data providers, and agents may provide information about one or more works of art, such as an estimate of a value of the art, information about the artist, historical period of the art, and other category information.

In block 275, a determined art rating information may be transmitted, e.g., by a processor to a user. For example, the processor may transmit an art rating to a user's terminal that outputs the art rating at a display device at the user's terminal. The user's terminal may output valuation information (e.g., historical bidding information such as prior winning bids, a fixed price (e.g., in points or dollars) for a specific work of art, a picture of the art itself, art in similar categories (e.g., from the same historical period or same artist), and other information.

In some embodiments, art rating information may comprise appraisal information. Art may be automatically appraised (e.g., valued) as described herein. For example, a specific work of art may be appraised based on an original appraisal value (e.g., by system or an agent in a prior time period), a bid history (e.g., in points) for the work of art, and a current valuation of the collective assets of the art exchange (e.g., based on a valuation of a corresponding ETF).

In block 280, a user may provide preferences concerning an art rating, e.g., by inputting preferences at an input device coupled to a server. The preferences may include a target art rating (e.g., a target minimum art rating). For instance, the preferences may specify a target art rating for various subsets of works of art. For example, for a given portfolio of works of art, a user may specify a preference for a higher minimum art rating in years 1-5 and a lower minimum art rating for years 6-7 and then a medium minimum art rating for years 8 and 9.

In block 285, a portfolio including one or more works of art may be determined and associated with a user. Information about the portfolio may be output at the user's terminal. For example, the processor may determine a portfolio of art that a user may be interested in based on a user's preferences (e.g., preferences for art of a particular historical period, art similar to that which the user has bid on, art in a point or share price range associated with the user by the system, art similar to that contributed by the user to the exchange, and art determined based on other information). The portfolio may comprise one or more works of art that the user may be interested in using and/or possessing based on the user's ownership interest in the art exchange. Images and rating information associated with the work of art may be output at the user's terminal.

In some embodiments, the system may automatically send such "suggested" works of art to users on a trial period (such as two weeks), e.g., free of charge.

Figure 3:
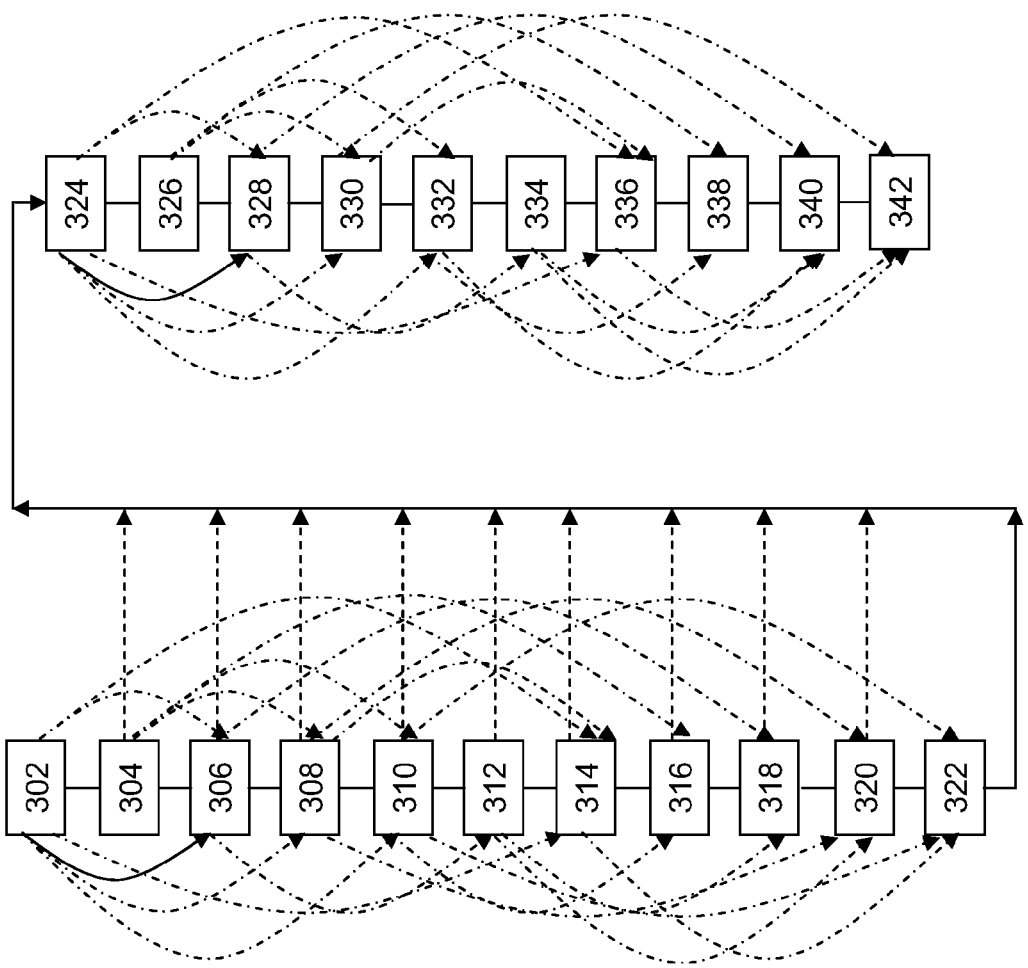
FIG. 3 depicts a flow diagram according to at least one embodiment of the methods disclosed herein.

FIG. 3 depicts a flow diagram according to at least one embodiment of the methods disclosed herein.

In some embodiments, an apparatus comprising at least one processor and a memory may accomplish the actions in the flow diagram. The memory may store a database. The database may associate each of a plurality of portfolios of art with a corresponding one of a plurality of users. Each portfolio of art may comprise one or more works of art. In some embodiments, each portfolio of art may comprise at least two works of art. The database may also associate a respective value for each of the plurality of portfolios of art with each of the plurality of users. The database may also associate a respective quantity with each of the plurality of users. The plurality of portfolios of art may collectively compose a plurality of works of art. The plurality of users may comprise a first user, a second user, a third user, and a fourth user. The memory may also store instructions which, when executed by the at least one processor, direct the at least one processor to perform the actions described for FIG. 3. (The memory may also store instructions which, when executed by the at least one processor, direct the at least one processor to perform any other action described in this application that is capable of being performed by one or more computers.)

In block 302, the respective value for each of a plurality of portfolios of art may be determined. The value may be any value, such as a monetary value (e.g., reflecting a monetary value of the work of art) or rating information (e.g., a value equal to the year the art work was created). Value information may be determined based on information such as information received from one or more users, one or more appraisers, and other methods, e.g., as described herein.

In block 304, the respective values may be stored in a database.

In block 306, a total value of the plurality of portfolios of art may be determined based on each determined respective value of each of the plurality of portfolios of art. For example, the total value of the plurality of portfolios may be a sum of the determined values of each portfolio in the plurality of portfolios.

In block 308, for each of the plurality of users, a respective quantity may be determined based on a ratio of (1) the determined value of the respective portfolio of art associated with the user to (2) the total value. Such quantity may reflect the user's initial "share" of the total art pool. In some embodiments, such quantity may comprise a user's "bid value", e.g., for a particular time period. For example, the system may determine that a particular user contributed 10% of the art assets in the pool, and may assign the user 100 bid points (out of a total of 1000 total bid points among all users, for example). The bid points may be issued periodically based on a user's contribution of art to the Art Exchange.

In block 310, the respective quantities determined for each of the users are associated in the database at an initial time with (1) the respective user associated with the quantity and (2) the respective value determined for the respective portfolio of art. For example, a spreadsheet may be created that shows each user and each user's initial share value.

In block 312, an indicia of the respective quantity determined for the user is transmitted to each of the users (e.g., respectively). For example, an email may be sent to each user indicating the quantity. For example, a share value may be distributed to each user, e.g., in the form of share certificates. For example, a user having a 20% share may be issued a certificate (e.g., electronically or hard copy via mail) representing 20 shares out of 100 total shares issued.

In block 314, a first request to receive at least one of the plurality of works of art at a first location that is designated by the first user is received from the first user. For example, a user may request that a particular painting by Picasso be delivered to his home address, e.g., so that he can possess it for a particular requested period of time. In some embodiments, users may bid on the right to use a particular piece of art for a particular time period (e.g., a year, or six months). In some embodiments, a particular time period may be a default time period for possessing a particular piece of art (e.g., six months, which may be renewable).

In block 316, after receiving the first request from the first user, a determined value of the at least one of the plurality of works of art is compared with the quantity determined for the first user. For example, the system may determine whether the value of the art contributed by the user's is equal to or greater than (or within a predetermined range of) a value of the art requested for use. The value determined for the requested art may be adjusted based on time of use. For example, it may cost less bid points to use a given work of art for six months as compared to using it for one year (which may be twice the bid price).

In block 318, after the step of comparing, the system may determine that the first request is approved. For example, the system may approve or disapprove the request based on whether the user's original art contribution (or some value ascribed thereto) is greater than the current request.

In block 320, after determining that the first request is approved, an instruction directing that the requested at least one of the plurality of works of art be delivered to the first location is transmitted. For example, the system may automatically send an instruction to UPS or another shipping company to acquire the work of art from a currently possessing party and deliver it to the designated address of the newly possessing user.

In block 322, a second request to redeem for a payment at least a portion of the quantity associated with the second user is received from the second user. For example, the second user may request to redeem one or more of his shares, e.g., for cash, originally contributed art, other art held by the art exchange, or other value.

In block 324, after the initial time and after receiving the second request from the second user, a current value of the quantity associated with the second user is determined The current value is different from the value associated with the second user in action (e). For example, the system may estimate a current value of the user's shares, e.g., based on a last trade value of other shares in the art exchange.

In block 326, a current value of the at least portion of the quantity associated with the second user is determined based on (1) the at least portion of the quantity associated with the second user and (2) the current value of the quantity associated with the second user.

In block 328, a payment amount is determined based on the determined current value. For example, if the redeemed portion is 2 shares out of 10 shares of the second user estimated to be worth $100,000, then the redeemed portion may be determined to be worth $20,000.

In block 330, an instruction directing that the payment amount be transferred to an account of the second user is transmitted. For example, the system may direct a bank to transmit $20,000 from an account of the art exchange to an account of the second user.

In block 332, the stored quantity associated with the second user is decreased by the at least portion of the quantity associated with the second user. For example, the user's share value may be reduced from 10 to 8 based on 2 shares being redeemed for cash payment.

In block 334, a third request to transfer at least a portion of the quantity associated with the third user to the fourth user in exchange for a quantity of funds from the fourth user is received from the third user. For example, a third user may request to sell all or a portion of his ownership shares (or bid points) to a fourth user. Parties may exchange their shares (e.g., for cash) by any of a variety of methods described herein.

In block 336, responsive to the third request, the stored quantity associated with the third user is decreased by the at least portion of the quantity associated with the third user. E.g., the third user's stock or bid point value may be decreased by the amount sold to the fourth user.

In block 338, responsive to the third request, the stored quantity associated with the fourth user is increased by the at least portion of the quantity associated with the third user. E.g., the fourth user's stock value or bid points may be increased by the amount purchased from the third user.

In block 340, responsive to the third request, the quantity of funds is transferred from an account of the fourth user to an account of the third user, e.g., as payment for the third user's shares or bid points.

In block 342, responsive to the third request, the quantity of funds is associated in the database with a quantity equal to the at least portion of the quantity associated with the third user. For example, the system may determine that the current value of the shares sold by the third user to the fourth user (e.g., 500 shares) is equal to the amount paid by the fourth user (e.g., $500,000).

It should be appreciated that various embodiments of the invention use some or all of the actions described in the blocks of the flowcharts described herein, and/or in combination with any other action described herein. Further, the actions described in those blocks may be performed in the order listed, or in any other order.

In some embodiments, assets must satisfy eligibility criteria to be eligible for contribution to a centralized fund. For example, an asset may be eligible for participation in the fund only if it is determined to have a value above a particular threshold, e.g., an appraisal value greater than $1 million.

Figure 4:
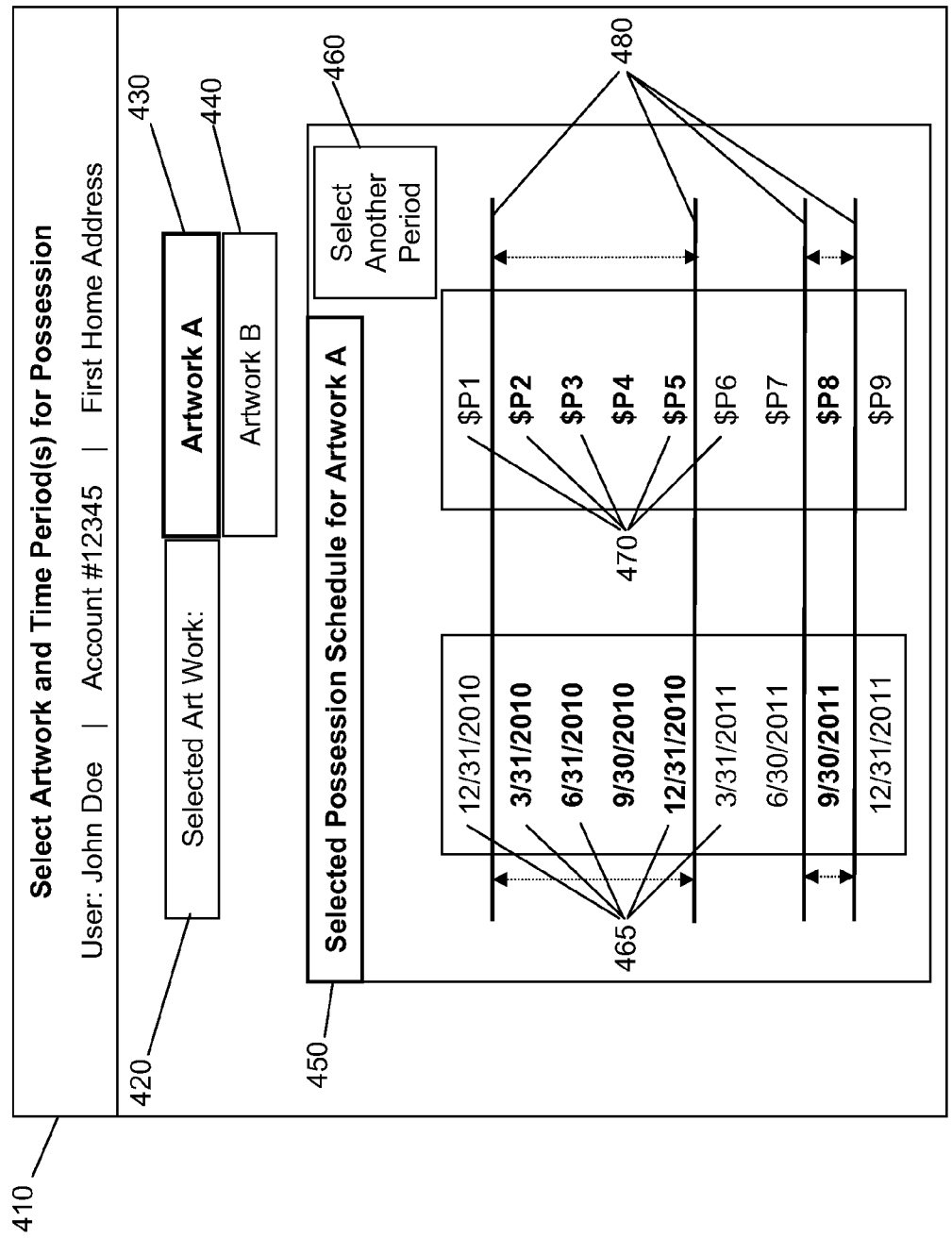
FIG. 4 depicts an exemplary interface for selecting a usage of an asset according to at least one embodiment of the methods disclosed herein.

FIG. 4 depicts an exemplary interface for selecting a usage of an asset according to at least one embodiment of the methods disclosed herein. Area 410 may indicate a particular user's login details, account number, and address for which the user is bidding for art. Area 420 may indicate a currently selected work of art 430, as opposed to a currently unselected work of art 440. The interface may also show one or more images of the selected artwork, such as a rotating 3-D image and/or various pictures at different angles and resolutions. A user may be able to select a work of art from among a plurality of other works of art 440. A user may also search a database by entering information (e.g., artist, title, style, or other rating information) to find a particular work of art. A user may select one or more time periods 465 for possession of the currently selected work of art in area 450. For example, the selected period end dates may appear in bold. The user may move sliders 480 to select the desired period. Prices (e.g., bid prices) 470 may reflect a current price (or price estimate or bid amount entered by user) for each time period.

Figure 5:
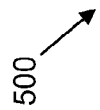
FIG. 5 depicts an exemplary interface for determining rating information according to at least one embodiment of the methods disclosed herein.

FIG. 5 depicts an exemplary interface for determining rating information according to at least one embodiment of the methods disclosed herein. For example, the interface 500 may comprise an interface displayed at a computer to a party such as a user, third party appraiser, owner, art collector, art expert, or other party. A person may enter information about a particular asset (e.g., work of art). In some embodiments, a person may enter rating information at the interface in the various boxes. For example, a person may enter rating information about the artist's name, title of the art, medium (e.g., painting or sculpture or photograph, etc.), historical time period of the art work (e.g., 1880's, Romantic period, Expressionist period), related artists (e.g., artists from the same historical period, from the same country, a spouse or known acquaintance, etc.), date of creation, school of art (e.g., Cubist school, or a particular city or artistic institution associated with the artist), city and/or country (e.g., a city and/or country associated with the artist or work of art, such as birthplace, city where artwork was created, city or country most associated with artist's professional life, etc.), size and/or dimensions of the artwork (e.g., height, width, depth, weight), the dominant color (e.g., blue, or black and white if the artwork is a black and white photo), other colors associated with the artwork, last sale price, estimated current value, notes, and other information. It should be appreciated that any rating information described herein may be entered at the interface. In some embodiments, a button may be clicked to upload images of the asset.

In some embodiments, the interface may be displayed to a user based on the user contributing a work of art. For instance, the system may prompt such user to enter rating information before or after the user submits a particular work of art into the exchange. In some embodiments, the interface may prompt a user to provide rating information after a user possesses the asset.

In some embodiments, the system may determine rating information based on information submitted by one user or multiple users concerning the same work of art. For instance, the system may aggregate rating information, or determine rating information (such as a name of artist) only after such name is confirmed by another rater, or determine rating information as the most commonly identified rating (e.g., city) by multiple raters.

It should be appreciated that in some embodiments, assets other than art (or assets that include art and other categories of assets) may be used. For example, instead of (or in addition to) portfolios of art, one or more other assets or types of assets may be pooled in a centralized fund for use, exchange, sale, auction, etc., (as described herein) by users and others. For example, assets for pooling, use, exchanging, and other functions described herein may include interests (such as fractional interests) in automobiles (e.g., exotic cars), boats (e.g., yachts, motor boats, sail boats), jewelry, real estate, vacation property, time shares, and other assets. For example, embodiments of the present invention may be implemented for a fund comprising works of art, jewelry, and yachts.

Accordingly, it should be appreciated by those of skill in the art that the systems and methods described herein may apply equally to assets other than art, such as jewelry, automobiles (e.g., sports cars and exotic cars), boats, furniture (e.g., antiques), appliances, instruments (e.g., guitars and guitar amplifiers, pianos, violins, violas, saxophones, and other instruments), airplanes (e.g., private jets), time shares (e.g., in real property such as a vacation home or personal property such as an airplane), other fractional interests, financial instruments such as stocks and bonds, and rights to services (such as massage services, car washing services, decorating services, etc.). For example, instead of owning art assets, an ETF of the present invention may hold assets comprising one or more automobiles such as antique cars or sports cars, wherein users may buy and sell shares of the ETF and some users may own and exchange usage rights to use one or more cars for specific periods of time. In some embodiments, the systems and methods of the present invention may apply to an exchange, fund, ETF, or other entity that holds a combination of different asset types, such as art, cars, and jewelry, or art and cars, or art and jewelry, or art and furniture, etc.

XII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure.

Other changes, substitutions, and alterations are also possible without departing from the spirit and scope of this disclosure, as defined by the claims herein.

XIII. References

The following patents and patent applications are hereby incorporated by reference herein for all purposes: U.S. patent application Ser. No. 11/986,190 filed Nov. 20, 2007; U.S. patent application Ser. No. 11/040,332 filed Jan. 20, 2005; U.S. patent application Ser. No. 10/753,131 filed Jan. 7, 2004; U.S. patent application Ser. No. 10/190,442 filed Jul. 5, 2002; U.S. patent application Ser. No. 10/696,542 filed Oct. 29, 2003; U.S. patent application Ser. No. 09/864,743 filed May 24, 2001; U.S. patent application Ser. No. 10/696,542 filed Oct. 29, 2003; U.S. patent application Ser. No. 10/281,166 filed on Oct. 28, 2002.

The following articles or other non-patent literature are hereby incorporated by reference herein for all purposes: the article entitled "Art as an Investment and the Underperformance of Masterpieces," by Mei and Moses, published in the December 2002 issue of the American Economic Review.

What is claimed is:

1. An apparatus, comprising:
(I) at least one processor; and
(II) a memory storing a database that (1) associates each of a plurality of portfolios of art with a corresponding user of a plurality of users, each portfolio of art comprising one or more works of art, (2) associates a respective value for each of the plurality of portfolios of art with each of the plurality of users, and (3) associates a respective quantity with each of the plurality of users, in which the plurality of portfolios of art collectively compose a plurality of works of art, and in which the plurality of users comprises a first user, a second user, a third user, and a fourth user;
in which the memory also stores instructions which, when executed by the at least one processor, direct the at least one processor to:
(a) determine the respective value for each of a plurality of portfolios of art;
(b) store the respective values in the database;
(c) determine a total value of the plurality of portfolios of art based on each determined respective value of each of the plurality of portfolios of art;
(d) for each of the plurality of users, determine a respective quantity based on a ratio of (1) the determined value of the respective portfolio of art associated with the user to (2) the total value;
(e) associate, in the database at an initial time, the respective quantities determined for each of the users with (1) the respective user associated with the quantity and (2) the respective value determined for the respective portfolio of art;
(f) transmit, to each of the users, an indicia of the respective quantity determined for the user;
(g) receive from the first user a first request to receive at least one of the plurality of works of art at a first location that is designated by the first user;
(h) after receiving the first request from the first user, compare (1) a determined value of the at least one of the plurality of works of art with (2) the quantity determined for the first user;
(i) after the act of comparing, determine that the first request is approved;
(j) after determining that the first request is approved, transmit an instruction directing that the requested at least one of the plurality of works of art be delivered to the first location;
(k) receive from the second user a second request to redeem for a payment at least a portion of the quantity associated with the second user;
(l) at a time that is (1) after the initial time and (2) after receiving the second request from the second user, determining a current value of the quantity associated with the second user, in which the current value is different from the value associated with the second user in action (e);
(m) determine a current value of the at least portion of the quantity associated with the second user based on (1) the at least portion of the quantity associated with the second user and (2) the current value of the quantity associated with the second user;

(n) determine a payment amount based on the determined current value;

(o) transmit an instruction directing that the payment amount be transferred to an account of the second user;

(p) decrease (1) the stored quantity associated with the second user by (2) the at least portion of the quantity associated with the second user;

(q) receive from the third user a third request to transfer at least a portion of the quantity associated with the third user to the fourth user in exchange for a quantity of funds from the fourth user; and (r) responsive to the third request:
(1) decrease (a) the stored quantity associated with the third user by (b) the at least portion of the quantity associated with the third user;
(2) increase (a) the stored quantity associated with the fourth user by (b) the at least portion of the quantity associated with the third user;
(3) transfer the quantity of funds from an account of the fourth user to an account of the third user; and
(4) associate in the database (a) the quantity of funds with (b) a quantity equal to the at least portion of the quantity associated with the third user.

2. The apparatus of claim 1, in which each of the plurality of works of art consists of a painting.

3. The apparatus of claim 1, in which the act of determining the respective value for each of a plurality of portfolios of art in action (a) comprises determining an appraisal value of at least one work of art.

4. The apparatus of claim 1, in which the act of determining a value for each portfolio of art comprises estimating a current market price of at least one of the works of art in the portfolio.

5. The apparatus of claim 1, in which the instructions, when executed by the at least one processor, further direct the at least one processor to:

after the act of transmitting an indicia of the respective quantity determined for each respective user, offer a specific one of the plurality of works of art for sale;

receive from a plurality of bidders a plurality of bids for the specific work of art; and sell the specific work of art to a specific one of the plurality of bidders at a price of a bid of the specific bidder.

6. The apparatus of claim 1, in which the instructions, when executed by the at least one processor, further direct the at least one processor to:

receive a plurality of bids to purchase at least one share of a legal ownership entity that owns the plurality of portfolios of art, each bid specifying a bid price and a quantity of shares of the legal ownership entity;

receive a plurality of offers to sell at least one share of the legal ownership entity, each offer specifying an offer price and a quantity of shares of the legal ownership entity;

match at least one bid with at least one offer; and execute a trade of a trade quantity of shares at a trade price based on the matching.

7. A method, comprising:

(a) determining a respective value for each of a plurality of portfolios of art, in which the act of determining is performed by
(I) at least one processor in communication with
(II) a memory storing a database that (1) associates each of a plurality of portfolios of art with a corresponding user of a plurality of users, each portfolio of art comprising one or more works of art, (2) associates the respective value for each of the plurality of portfolios of art with each of the plurality of users, and (3) associates a respective quantity with each of the plurality of users, in which the plurality of portfolios of art collectively compose a plurality of works of art, and in which the plurality of users comprises a first user, a second user, a third user, and a fourth user;

(b) storing by the at least one processor the respective values in the database;

(c) determining by the at least one processor a total value of the plurality of portfolios of art based on each determined respective value of each of the plurality of portfolios of art;

(d) for each of the plurality of users, determining by the at least one processor a respective quantity based on a ratio of (1) the determined value of the respective portfolio of art associated with the user to (2) the total value;

(e) associating by the at least one processor, in the database at an initial time, the respective quantities determined for each of the users with (1) the respective user associated with the quantity and (2) the respective value determined for the respective portfolio of art;

(f) transmitting by the at least one processor, to each of the users, an indicia of the respective quantity determined for the user;

(g) receiving by the at least one processor from the first user a first request to receive at least one of the plurality of works of art at a first location that is designated by the first user;

(h) after receiving the first request from the first user, comparing by the at least one processor (1) a determined value of the at least one of the plurality of works of art with (2) the quantity determined for the first user;

(i) after the step of comparing, determining by the at least one processor that the first request is approved;

(j) after determining that the first request is approved, transmitting by the at least one processor an instruction directing that the requested at least one of the plurality of works of art be delivered to the first location;

(k) receiving by the at least one processor from the second user a second request to redeem for a payment at least a portion of the quantity associated with the second user;

(l) at a time that is (1) after the initial time and (2) after receiving the second request from the second user, determining by the at least one processor a current value of the quantity associated with the second user, in which the current value is different from the value associated with the second user in action (e);

(m) determining by the at least one processor a current value of the at least portion of the quantity associated with the second user based on (1) the at least portion of the quantity associated with the second user and (2) the current value of the quantity associated with the second user;

(n) determining by the at least one processor a payment amount based on the determined current value;

(o) transmitting by the at least one processor an instruction directing that the payment amount be transferred to an account of the second user;

(p) decreasing by the at least one processor (1) the stored quantity associated with the second user by (2) the at least portion of the quantity associated with the second user;

(q) receiving by the at least one processor from the third user a third request to transfer at least a portion of the quantity associated with the third user to the fourth user in exchange for a quantity of funds from the fourth user; and (r) responsive to the third request:
(1) decreasing by the at least one processor (a) the stored quantity associated with the third user by (b) the at least portion of the quantity associated with the third user;
(2) increasing by the at least one processor (a) the stored quantity associated with the fourth user by (b) the at least portion of the quantity associated with the third user;
(3) transferring by the at least one processor the quantity of funds from an account of the fourth user to an account of the third user; and
(4) associating by the at least one processor in the database (a) the quantity of funds with (b) a quantity equal to the at least portion of the quantity associated with the third user.

8. An apparatus, comprising:
(I) at least one processor; and
(II) a memory storing a database that (1) associates a plurality of portfolios of art with a corresponding plurality of users such that each of the plurality of users is associated with a corresponding one of the plurality of portfolios of art and each of the plurality of portfolios of art is associated with a corresponding one of the plurality of users, each portfolio of art comprising one or more paintings, (2) associates a respective value for each of the plurality of portfolios of art with each of the plurality of users, and (3) associates a respective quantity with each of the plurality of users, in which the plurality of portfolios of art collectively compose a plurality of works of art, and in which the plurality of users comprises a first user, a second user, a third user, and a fourth user;
in which the processor is configured to:
(a) determine the respective value for each of a plurality of portfolios of art;
(b) store the respective values in the database;
(c) determine a total value of the plurality of portfolios of art based on each determined respective value of each of the plurality of portfolios of art;
(d) for each of the plurality of users, determine a respective quantity based on a ratio of (1) the determined value of the respective portfolio of art associated with the user to (2) the total value;
(e) associate, in the database at an initial time, the respective quantities determined for each of the users with (1) the respective user associated with the quantity and (2) the respective value determined for the respective portfolio of art;
(f) transmit, to each of the users, an indicia of the respective quantity determined for the user;
(g) receive from the first user a first request to receive at least one of the plurality of works of art at a first location that is designated by the first user, the requested at least one of the plurality of works comprising a designated painting;
(h) after receiving the first request from the first user, compare (1) a determined value of the at least one of the plurality of works of art with (2) the quantity determined for the first user;
(i) after the step of comparing, determine that the first request is approved;
(j) after determining that the first request is approved, transmit an instruction directing that the requested at least one of the plurality of works of art be delivered to the first location;
(k) receive from the second user a second request to redeem for a payment at least a portion of the quantity associated with the second user;
(l) at a time that is (1) after the initial time and (2) after receiving the second request from the second user, determine a current value of the quantity associated with the second user, in which the current value is different from the value associated with the second user in action (e);
(m) determine a current value of the at least portion of the quantity associated with the second user based on (1) the at least portion of the quantity associated with the second user and (2) the current value of the quantity associated with the second user;
(n) determine a payment amount based on the determined current value;
(o) transmit an instruction directing that the payment amount be transferred to an account of the second user;
(p) decrease (1) the stored quantity associated with the second user by (2) the at least portion of the quantity associated with the second user;
(q) receive from the third user a third request to transfer at least a portion of the quantity associated with the third user to the fourth user in exchange for a quantity of funds from the fourth user; and
(r) responsive to the third request:
(1) decrease (a) the stored quantity associated with the third user by (b) the at least portion of the quantity associated with the third user;
(2) increase (a) the stored quantity associated with the fourth user by (b) the at least portion of the quantity associated with the third user;
(3) transfer the quantity of funds from an account of the fourth user to an account of the third user; and
(4) associate in the database (a) the quantity of funds with (b) a quantity equal to the at least portion of the quantity associated with the third user.

* * * * *

UNITED STATES PATENT AND TRADEMARK OFFICE
CERTIFICATE OF CORRECTION

| | | |
|---|---|---|
| PATENT NO. | : 8,380,602 B2 | Page 1 of 1 |
| APPLICATION NO. | : 12/776230 | |
| DATED | : February 19, 2013 | |
| INVENTOR(S) | : Howard W. Lutnick, Dean P. Alderucci and Thomas D. Bradshaw | |

It is certified that error appears in the above-identified patent and that said Letters Patent is hereby corrected as shown below:

On the Title Page

Item (12), line 2, please change "Lutnicj et al." to "Lutnick et al.".
Item (75), line 1, please change "Howad W. Lutnicj" to "Howard W. Lutnick".

Signed and Sealed this
Ninth Day of April, 2013

Teresa Stanek Rea
*Acting Director of the United States Patent and Trademark Office*